June 1, 1926.

W. H. POND

COATED BUTTER

Filed Sept. 17, 1925

1,587,414

WITNESSES

INVENTOR
WILLIAM H. POND
BY
ATTORNEYS

Patented June 1, 1926.

1,587,414

UNITED STATES PATENT OFFICE.

WILLIAM HART POND, OF NEW YORK, N. Y., ASSIGNOR OF ONE-HALF TO LEVIS W. MINFORD, 2D, OF SCARSDALE, NEW YORK.

COATED BUTTER.

Application filed September 17, 1925. Serial No. 56,999.

This invention relates to a coated food and particularly to foods capable of melting at a comparatively low temperature, as for instance, butter, lard, ice cream and the like, the object of the invention being to provide an edible, unnoticeable coating to these articles to hold them in their real shape even though they may become soft.

Another object of the invention is to provide a coated article of food, as for instance, butter, wherein the coating operates to prevent adjacent pieces of butter from sticking together and also prevents loss of moisture or volatile substance by evaporation.

A further object of the invention is to provide a coated butter or other edible article wherein the coating is so formed as to prevent the butter or other article from absorbing odors from the surrounding medium while presenting a coating which is unnoticeable, odorless and tasteless.

A still further object of the invention is to provide a coating for butter and the like which will support the butter even when in a soft condition but which will not produce a chemical re-action therewith and which is of a higher melting point than the butter.

In the accompanying drawing—

Figure 1:
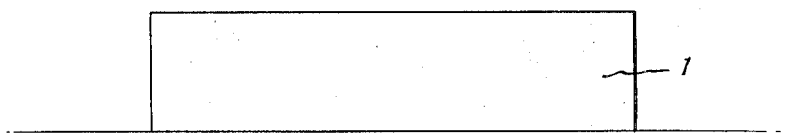
Figure 1 is an elevation of a piece of butter uncoated.
Figure 2:
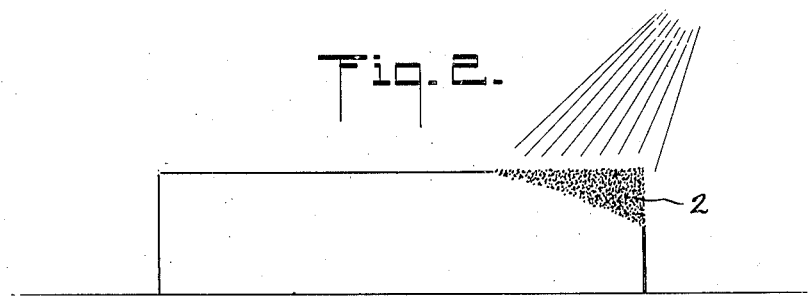
Figure 2 is a view similar to Figure 1 but showing how the butter may be sprayed to produce a coating thereon.
Figure 3:
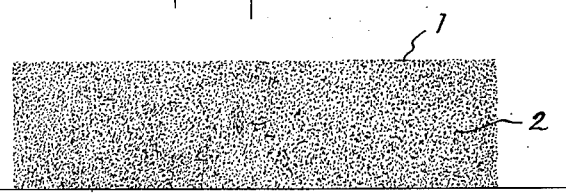
Figure 3 is a view of the butter shown in Figure 1 after the same has been completely sprayed and a coating provided over the entire surface.
Figure 4:
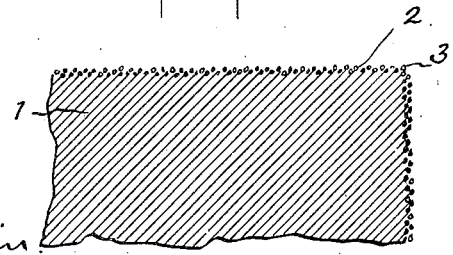
Figure 4 is an enlarged fragmentary view showing the appearance of the coating.

Referring to the accompanying drawing by numerals, 1 indicates a piece of butter which may be of any size and 2 the coating applied thereto as shown particularly in Figure 4. This coating consists of a number of small particles 3 which have been embedded in the butter 1. When the expression "butter" is used, it will be understood that lard or other similar material is intended to be covered as the invention is not on the butter but on coating butter and similar material as described herein.

In coating the butter 1, it has been found that hydrogenated cocoanut oil with a melting point of 110° F. will answer all requirements. In coating the butter, the cocoanut oil mentioned is melted and sprayed on the relatively cold butter until the same is entirely covered. The spraying action divides the oil into very fine particles so that when it reaches the butter through the spraying action it is congealed into thousands of minute solid particles and these embed themselves in the surface of the butter. As the quantity of butter is comparatively much larger than the sprayed oil, the hot particles sprayed onto the butter melts only a trifle of butter and in fact, only enough to permit them to be embedded in the surface of the butter, thus making the coating invisible. It will be understood that any substance may be used which is edible and which is either substantially colorless or which is of substantially the same color as the butter.

At present it is the fashion to sell butter in various size packages of one pound or less and to wrap the butter in some form of paper. According to the present invention, the coating will dispense with the wrapper and will effectively keep the butter from sticking together when packed in a container. By reason of this characteristic, the butter can be cut into as small pieces as desired, such as are used in restaurants and hotel dining service, coated and then packed one on top of the other in a box without danger of sticking together and at a great saving of time and expense. The coated butter is not objectionable to any one as it is edible and the coating cannot be detected by the unaided senses. It cannot be seen, felt or tasted and it does not give off an odor. When the butter is spread upon bread or is melted on hot foods, such as griddle cakes, it cannot be detected as the quantity is so small that it readily mixes with the butter when spread and on the hot foods will readily melt and mix with the butter.

The cocoanut oil or other fat used in making the coating preferably has a melting point of 110° F. which causes the coating to function to prevent the butter from sticking together when the butter becomes soft but will not melt as soon as the butter. In case the butter should become very soft and in fact, so soft as not to be capable of being picked up, it may be chilled by placing on ice and as soon as the butter has hardened the pieces of butter will readily separate.

The coating is continually invisible and is so extremely thin that it is almost microscopic but continually functions to prevent the butter from sticking together and also functions to hold the butter in shape when the same is somewhat soft. The coating may be used on small pieces for restaurant use or may be used on large pieces, as for instance, pound pieces and the pieces packed together in a large box without danger of sticking and without the use of separate wrapping paper or other wrapping material.

What I claim is:

1. An article of food, comprising an edible article, and a substantially invisible edible coating therefor presenting a surface adapted to prevent adherence of similarly coated bodies.

2. An article of food, comprising an edible body, and an edible coating therefor, said coating being formed of a plurality of minute particles embedded in the surface of the body and presenting an appearance which cannot be distinguished from the ordinary appearance of the body.

3. An article of food, comprising an edible body, and an edible invisible coating therefor consisting of fine particles of hydrogenated cocoanut oil embedded in the surface of the body.

4. An article of food consisting of an edible body and an invisible coating thereon consisting of a hydrogenated edible material in fine particles forming an uneven surface.

WILLIAM HART POND.